Patented June 14, 1932

1,862,865

UNITED STATES PATENT OFFICE

OTTO STALLMANN, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

MONO-BROMO-MONO-CHLORO INDANTHRONE AND PROCESS OF PREPARING THE SAME

No Drawing.   Application filed July 1, 1929.  Serial No. 375,329.

This invention relates to vat dyestuffs of the indanthrone family and to a process of preparing these vat dyestuffs. More particularly, the invention relates to and has for its object the prepartion of a mono-chloro-mono-bromo-anthraquinone azine and its reduction product, the corresponding dihydro azine.

Other and further important objects of this invention will become apparent from the following description and appended claims.

The dyestuffs of this invention are characterized by the fact that they, in common with N - dihydro - 1,2,2′,1′ - anthraquinone azine, dye cotton in blue shades fast to light and washing and in addition possess the property of being remarkably fast to bleaching agents.

In a copending application Ser. No. 375,318 executed of even date herewith, there are described various methods of preparing an intermediate complex body by the treatment of 1 mole of 3,3′-dibromo-N-dihydro-1,2,2′,1′-anthraquinone azine with about 2 moles of sulfuryl chloride at moderately elevated temperatures. The complex body thus formed most probably consists of 3,3′-dibromo-N-dihydro-1,2,2′,1′-anthraquinone azine and sulfuryl chloride in loose combination in the proportion of 1 mole of the former body with two moles of the latter. This complex body may be obtained from its suspension in nitrobenzene in the form of small brown plates, which upon exposure to air, decompose with the evolution of sufuryl chloride and turn green.

I have now found that this intermediate complex body can be readily transformed into a halogenated anthraquinone azine of definite composition by treatment with hydrolyzing agents. Upon subsequent reduction, the azine body can be transformed into the corresponding dihydro azine. The indanthrone thus obtained analyzes substantially 1 atom of chlorine and 1 atom of bromine to the molecule.

The chemical reactions involved in the preparation of the complex body and its hydrolysis into the corresponding anthraquinone azine, starting with 3,3′-dibromo-N-dihydro - 1,2,2′,1′ - anthraquinone azine, are probably best represented by the following equations,

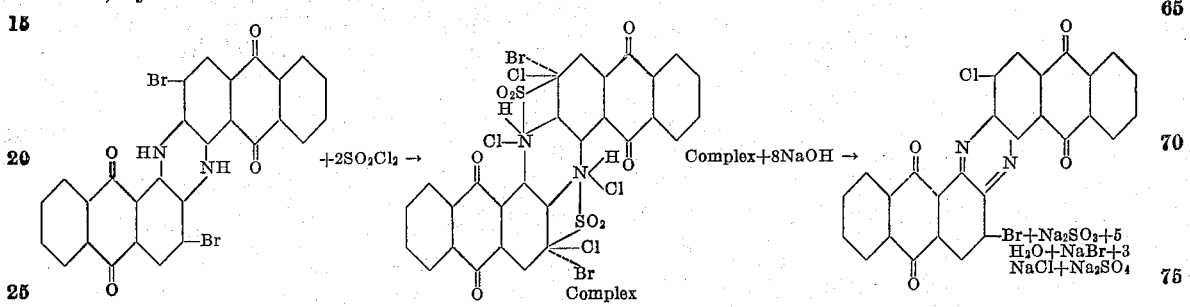

It will be understood, however, that these equations merely represent the probable reactions involved and are in no way intended as limitations upon the scope of my invention.

The dihydroazine body as obtained is a dark blue powder, soluble in concentrated sulphuric acid to give an olive brown solution, from which it may be precipitated by the addition of water in the form of blue flakes. It dyes cotton in blue shades remarkably fast to bleaching agents, light and washing.

The following examples will serve to illustrate preferred embodiments of my invention, parts by weight being given:

Example 1

Into 525 parts of nitrobenzene are added 75 parts of 3,3′-dibromo-N-dihydro-1,2,2′,1′-anthraquinone azine and 51 parts of sulfuryl chloride. The mass is heated up to about 70° C. within one hour and maintained at a temperature between 70 and 75° C. for an additional 1½ to 2 hours. The mass is then cooled to room temperature and filtered. The filter cake is washed with 300 parts of cold nitrobenzene and the washed cake is charged without unnecessary delay into about 1000 parts of an aqueous 3% caustic soda solution. The alkaline mass is heated to the boiling point and steamed to remove residual nitrobenzene. The product, which precipitates, is filtered off and washed until free from alkali. After drying, the washed product is obtained in the form of the azine.

The azine obtained is transformed into the dihydroazine by any of the known methods applicable to the reduction of similar bodies, as for example, by pasting up the azine with concentrated sulfuric acid and then diluting with water to obtain a fine suspension and then washing this product free from acid with water. The finely divided azine is then reduced with sodium sulfide solution to the hydroazine form and may be filtered off. The analysis of the azine is 6.42% chlorine and 15.46% bromine as contrasted with a theoretical analysis for mono-chloro-monobromo anthraquinone azine of 6.4% chlorine and 14.4% bromine. To the best of my knowledge, the chlorine and bromine atoms are in the 3,3'-positions, respectively.

*Example 2*

60 parts of 3,3'-dibromo-N-dihydro-1,2,2',1'-anthraquinone azine are added to 420 parts of dry nitrobenzene. There are then added to this mixture 34 parts of sulfuryl chloride and the mass is stirred at room temperature for about 12 hours. Thereafter, the mass is heated within one hour to 50 to 60° C. and maintained at this temperature until a test sample under the microscope shows complete formation of the complex body as indicated by the presence of brown plates and an absence of blue needles. The completion of the reaction requires from 1 to 3 hours.

The mass is then cooled to 40° C. and to it are added 100 parts of aniline over a period of from ½ to 1 hour, the temperature being maintained at about 40° C. with cooling means if necessary.

The mass is then heated within 2 to 3 hours to 180° C. and kept at about 180° C. for an additional ½ hour. The mass is then cooled to 60 to 80° C. and filtered. The filter cake is washed with about 100 parts of nitrobenzene and steam distilled in the presence of water until free from nitrobenzene. The product is then filtered and washed with water and dried. The product obtained is mono-chloro-mono-bromo N-dihydro-1,2,2',1'-anthraquinone azine analyzing 14.94% bromine and 6.83% chlorine as compared to a theoretical analysis for this compound of 14.4% bromine and 6.4% chlorine.

The product as obtained according to the process described in Example 2 is most probably 3-chloro-3'-bromo N-dihydro-1,2,2',1'-anthraquinone azine. It should be noted that in this case, the aniline acts not only as a hydrolyzing agent but also as a reducing agent to form the dihydro anthraquinone azine directly without the necessity of having to reduce the azine as described in Example 1.

It is to be understood that other saponifying agents, such as caustic potash and the like, may be employed and that other proportions of materials and temperature conditions may be used.

As used in the specification and claims, the term "member of the indanthrone family" is meant to include the azine and its reduction products, as for example, the hydroazine or the leuco dihydro azine and intermediate reduction products. These products can be transformed into one another by reduction and oxidation methods known in the literature and applicable to the parent material N-dihydro-1,2,2',1'-anthraquinone azine.

Instead of isolating the complex body consisting of 3,3'-dibromo-N-dihydro-1,2,2',1'-anthraquinone azine and sulfuryl chloride, a suspension of this complex body in an inert diluent, such as nitrobenzene, may be treated without isolation with a hydrolyzing agent. In general, this complex body may most suitably be formed by treating substantially one molecular proportion of 3,3'-dibromo-N-dihydro-1,2,2',1'-anthraquinone azine in an inert diluent with two molecular proportions of sulfuryl chloride at temperatures below 80° C.

In the claims below it should be understood that where new products, dyestuffs, or articles of manufacture are claimed, I mean to include these bodies not only in substance, but also in whatever state they exist when applied to material dyed, printed, or pigmented therewith.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing a mixed dihalogenated member of the indanthrone family, which comprises hydrolyzing the intermediate reaction product obtainable by treating substantially one molecular proportion of 3,3'-dibromo-N-dihydro-1,2,2',1'-anthraquinone azine in an inert diluent with 2 molecular proportions of sulfuryl chloride at temperatures below 80° C.

2. The process of preparing a mixed dihalogenated indanthrone, which comprises hydrolyzing the intermediate reaction product obtainable by treating substantially one molecular proportion of 3,3'-dibromo-N-dihydro-1,2,2',1'-anthraquinone azine in an inert diluent with 2 molecular proportions of sulfuryl chloride at temperatures below 80° C. and thereafter reducing the hydrolyzed product to the hydroazine form.

3. The process of preparing a halogenated member of the indanthrone family, which comprises heating a complex body consisting of 3,3'-dibromo-N-dihydro-1,2,2',1'-anthraquinone azine and sulfuryl chloride with a hydrolyzing agent to form a substantially mono-chloro-mono-bromo-anthraquinone azine.

4. The process of preparing a halogenated member of the indanthrone family, which comprises heating a complex body consisting of 3,3'-dibromo-N-dihydro-1,2,2',1'-anthraquinone azine and sulfuryl chloride with an aqueous caustic alkali solution to form a substantially mono-chloro-mono-bromo-anthraquinone azine.

5. The process of preparing a halogenated member of the indanthrone family, which comprises treating a complex body consisting of 3,3'-dibromo-N-dihydro-1,2,2',1'-anthraquinone azine and sulfuryl chloride at about the boiling temperature of the subseqent mixture with an aqueous caustic alkali solution to form a substantially mono-chloro-mono-bromo-anthraquinone azine.

6. The process of preparing 3-chloro-3'-bromo-anthraquinone azine, which comprises treating a complex body consisting of 3,3'-dibromo-N-dihydro-1,2,2',1'-anthraquinone azine and sulfuryl chloride in loose combination with each other with a dilute caustic soda solution, heating the mass to about the boiling point, and recovering from the mass 3-chloro-3'-bromo-anthraquinone azine.

7. As a new composition of matter, a halogenated member of the indanthrone family containing substantially one atom of chlorine and one atom of bromine to the molecule, the bromine atom being in a 3-position.

8. As a new composition of matter a mono-bromo-mono-chloro-member of the indanthrone family wherein the bromine and chlorine atoms are in the 3' and 3-positions, respectively.

9. As a new composition of matter, a halogenated member of the indanthrone family having most probably the following formula:

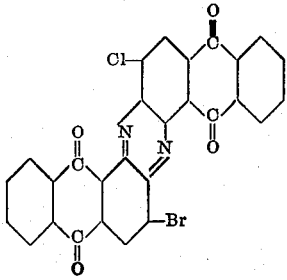

which may be prepared by hydrolyzing the intermediate product obtainable be reacting upon substantially one molecular proportion of 3,3'-dibromo-N-dihydro-1,2,2',1'-anthraquinone azine with about two molecular proportions of sulfuryl chloride at temperatures below 80° C.

In testimony whereof I have hereunto subscribed my name at Carrollville, Milwaukee County, Wisconsin.

OTTO STALLMANN.